US012600330B2

(12) United States Patent
Schmidt et al.

(10) Patent No.: US 12,600,330 B2
(45) Date of Patent: Apr. 14, 2026

(54) SENSOR ASSEMBLY FOR A VEHICLE AND MULTI-CIRCUIT BRAKING SYSTEM

(71) Applicant: Robert Bosch GmbH, Stuttgart (DE)

(72) Inventors: Thomas Schmidt, Bietigheim-Bissingen (DE); Fei Xie, Gemmrigheim (DE); Bernd Stoehr, Sachsenheim (DE); Sebastian Frey, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 702 days.

(21) Appl. No.: 17/927,611

(22) PCT Filed: May 25, 2021

(86) PCT No.: PCT/EP2021/063863
§ 371 (c)(1),
(2) Date: Nov. 23, 2022

(87) PCT Pub. No.: WO2021/239713
PCT Pub. Date: Dec. 2, 2021

(65) Prior Publication Data
US 2023/0202435 A1     Jun. 29, 2023

(30) Foreign Application Priority Data
May 26, 2020     (DE) ..................... 10 2020 206 567.5

(51) Int. Cl.
*B60T 8/171* (2006.01)
*B60L 15/20* (2006.01)
(Continued)

(52) U.S. Cl.
CPC ................ *B60T 8/171* (2013.01); *B60T 7/12* (2013.01); *B60T 8/172* (2013.01); *B60T 8/885* (2013.01);
(Continued)

(58) Field of Classification Search
CPC . B60T 8/171; B60T 7/12; B60T 8/172; B60T 8/885; B60T 2240/00;
(Continued)

(56) References Cited

FOREIGN PATENT DOCUMENTS

| | | | | |
|---|---|---|---|---|
| DE | 10028094 A1 | * | 12/2001 | ............ B60T 8/4059 |
| DE | 10 2015 110 965 A1 | | 1/2016 | |

(Continued)

OTHER PUBLICATIONS

International Search Report corresponding to PCT Application No. PCT/EP2021/063863, mailed Aug. 19, 2021 (German and English language document) (6 pages).

*Primary Examiner* — Long T Tran
*Assistant Examiner* — Charles J Brauch
(74) *Attorney, Agent, or Firm* — Maginot, Moore & Beck LLP

(57) ABSTRACT

A sensor assembly for a vehicle includes control devices having respective evaluation and control units, and sensor elements assigned to a respective brakeable wheel and one of the ECUs and record a physical variable of the associated wheel and output same as an output signal to the associated ECU. The control devices execute a brake function based on the recorded physical variables. A respective sensor element is arranged on the brakeable wheels of a first axle. The output signals thereof are output to different ECUs of a single control device. Two respective sensor elements are arranged on brakeable wheels of a second axle. The output signals thereof are output to other ECUs in different control devices. The ECUs of the first axle output the respective received output signal to an ECU of another control device, such that each control device receives the corresponding recorded physical variable from all wheels.

15 Claims, 1 Drawing Sheet

(51) Int. Cl.
  *B60T 7/12*   (2006.01)
  *B60T 8/172*   (2006.01)
  *B60T 8/88*   (2006.01)

(52) U.S. Cl.
  CPC ........... *B60L 15/20* (2013.01); *B60T 2240/00* (2013.01); *B60T 2270/30* (2013.01); *B60T 2270/402* (2013.01); *B60T 2270/413* (2013.01)

(58) Field of Classification Search
  CPC .......... B60T 2270/30; B60T 2270/402; B60T 2270/413; B60T 8/88; B60T 8/32; B60L 15/20
  See application file for complete search history.

(56)         References Cited

FOREIGN PATENT DOCUMENTS

| | | | | |
|---|---|---|---|---|
| DE | 10 2015 209 565 | A1 | 12/2016 | |
| DE | 102018204615 | A1 * | 10/2019 | .............. G01P 21/02 |
| EP | 1 227 007 | A2 | 7/2002 | |
| EP | 2340975 | A1 * | 7/2011 | .......... B60W 30/045 |
| JP | 2006-521948 | A | 9/2006 | |
| JP | 2018-518412 | A | 7/2018 | |
| WO | 2020/071345 | A1 | 4/2020 | |

* cited by examiner

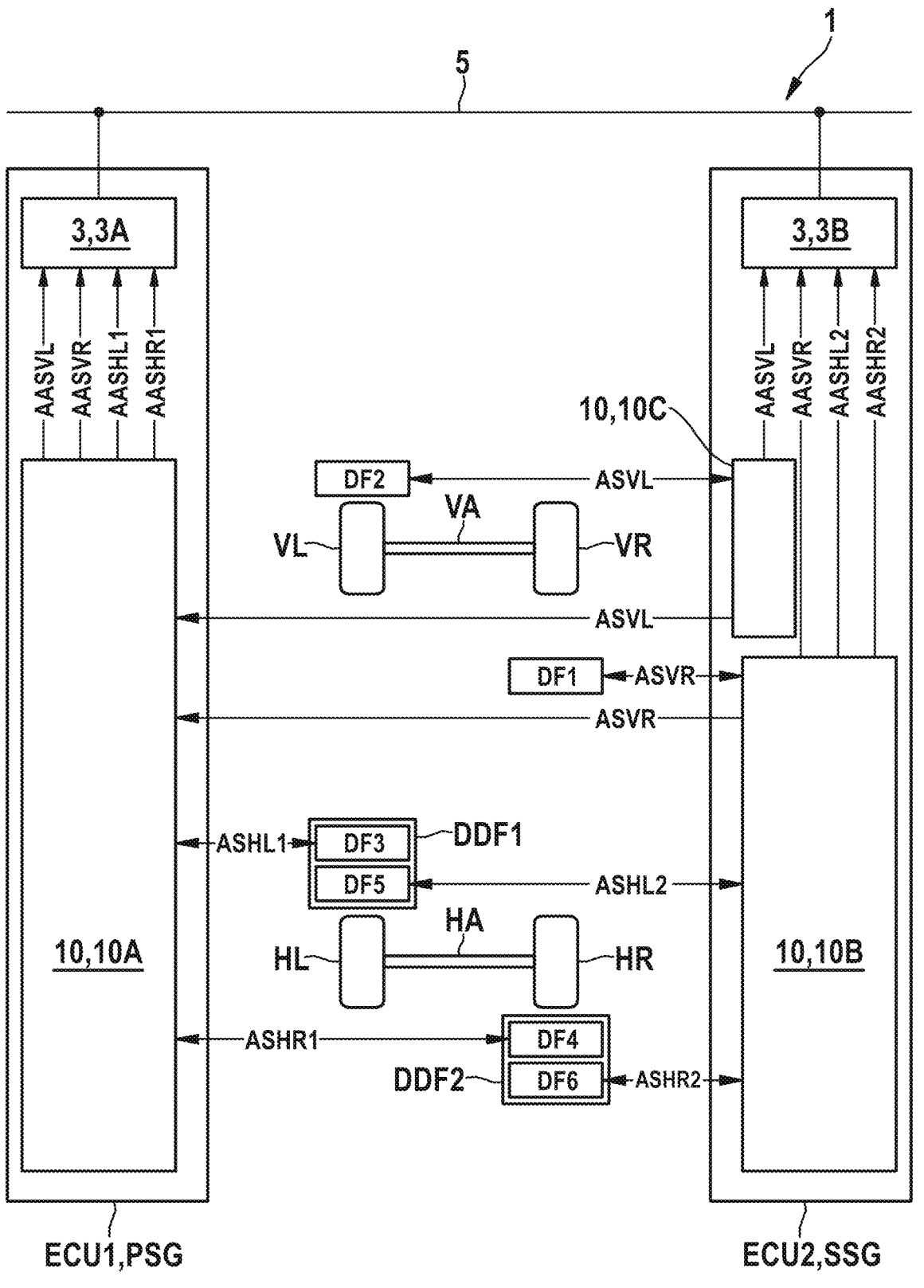

SENSOR ASSEMBLY FOR A VEHICLE AND MULTI-CIRCUIT BRAKING SYSTEM

This application is a 35 U.S.C. § 371 National Stage Application of PCT/EP2021/063863, filed on May 25, 2021, which claims the benefit of priority to Serial No. DE 10 2020 206 567.5, filed on May 26, 2020 in Germany, the disclosures of which are incorporated herein by reference in their entirety.

BACKGROUND

The disclosure relates to a sensor assembly for a vehicle, comprising at least two control devices, each having at least one evaluation and control unit, and multiple sensor elements which are each assigned to a brakeable vehicle wheel and one of the evaluation and control units of the control devices and designed to record at least one physical variable of the associated vehicle wheel and output same as an output signal directly to the associated evaluation and control unit. The control devices are each designed to execute at least one brake function of the vehicle based on the recorded physical variables of the brakeable vehicle wheels. The subject-matter of the disclosure is also a corresponding multi-circuit braking system comprising a sensor assembly of this type.

For highly automated or autonomous driving and for semi-automated or semi-autonomous driving functions, redundancies are typically required so that the availability of sensors and functions is also ensured in many fault events. Thus, a braking system with primary and secondary stabilization of the vehicle is typically used. More specifically, two independent braking devices or braking control systems are used. Both should ideally receive speed information items from speed sensors assigned to each vehicle wheel, with a high degree of availability. In today's solutions, the speed sensors are directly connected point-to-point with a primary control device. In a two-box system approach, such as an ESP system as a primary system and an electromechanical or other electrical brake booster as a secondary system, or an integrated power brake (IPB) as a primary system and a redundant brake unit (RBU) as a secondary system, the sensor signals of the speed sensors are either looped through the primary control device to the secondary control device, which requires additional effort and costs and also does not cover all fault cases, or the speed sensors are switched between the primary control device and the secondary control device via a switching device in the event of a fault. Another known solution provides eight speed sensors, four of which are directly connected to the primary control device and four of which are directly connected to the secondary control device. With this division, two speed sensors are installed on each vehicle wheel, so that the systems can redundantly stabilize the vehicle. This requires a total of eight speed sensors per vehicle along with the associated double costs for sensors and wiring.

A method and an apparatus for operating a vehicle are known from DE 10 2015 209 565 A1. The apparatus comprises a respective input for an external speed sensor, a first control device, a second control device comprising a speed sensing device for each speed sensor, and a computing device by means of which wheel speeds are determinable. Here, speed signals from the speed sensing devices can be supplied to the first control device and to outputs of the apparatus, wherein the speed sensing directions are functionally decoupled from one another, and wherein the second control device is functionally decoupled from the first control device and from the computing device. Thus, each individual channel of a speed sensing system is designed to be redundant and wakeable. In the event that the apparatus is defective, wheel speeds can still be made available for other control devices that are connectable to the outputs of the apparatus, for example for actuating a secondary braking system. This is achieved in that the speed sensing directions act as a type of splitter that distributes the speed signals to multiple users.

From DE 10 2015 110 965 A1, an autonomous vehicle control subsystem is known, which comprises first and second brake control modules communicatively and electrically connected to a another and multiple wheel speed sensors. Here, a first subset of the wheel speed sensors including at least one of the first wheel speed sensors is communicatively connected to the first brake control module and not to the second brake control module, and a second subset of the wheel speed sensors including at least a second one of the wheel speed sensors is communicatively connected to the second brake control module and not to the first brake control module. During typical operation of the vehicle and the autonomous vehicle control subsystem, the brake control modules communicate with one another in order to provide wheel speed data from different sensors, thereby allowing each of the brake control modules to execute operations for controlling brakes of the vehicle. However, if a fault occurs in one of the brake control modules, e.g., a loss of power, the other vehicle control subsystem will have at least some wheel speed data, i.e., wheel speed data from at least one wheel speed sensor.

SUMMARY

The sensor assembly for a vehicle comprising the features of the disclosure and the corresponding multi-circuit braking system each carry the advantage in that a redundant sensor element concept can be implemented in part with standard sensor elements, which are preferably designed as speed sensors, and with dual sensors, each having two sensor elements preferably designed as speed sensors, and without a switching apparatus, where some costs for double speed sensors and wiring can be saved. In addition, switching parts can be saved in the two control devices. In a preferred embodiment of the sensor assembly with six speed sensors and three evaluation and control units distributed over two control devices, a transfer or takeover of the sensor elements between the two control devices is advantageously possible in the case of a fault without an additional switching apparatus and without latency time, because both control devices can simultaneously receive and evaluate the recorded at least one physical variable of all brakeable vehicle wheels via the output signals of the six speed sensors.

Embodiments of the present disclosure provide a sensor unit for a vehicle, comprising at least two control devices, each having at least one evaluation and control unit, and multiple sensor elements which are each assigned to a brakeable vehicle wheel and one of the evaluation and control units of the control devices and designed to record at least one physical variable of the associated vehicle wheel and output same as an output signal directly to the associated evaluation and control unit. The control devices are each designed to execute at least one brake function of the vehicle based on the recorded physical variables of the brakeable vehicle wheels. Here, a sensor element is arranged at least on each of the brakeable vehicle wheels of a second vehicle axle, wherein the output signals thereof are output to different evaluation and control units, which are arranged in a common control device, wherein two sensor elements are arranged at least on each of the brakeable vehicle wheels of a first vehicle axle, wherein the output signals thereof are output to evaluation and control units, which are arranged in different control devices. The evaluation and control units associated with the first vehicle axle are designed to output the respective received output signal to at least one evaluation and control unit of another control device, such that the individual control devices each receive the corresponding at least one recorded physical variable from all brakeable vehicle wheels.

In addition, a multi-circuit braking system is proposed, in particular for a highly automated or autonomous vehicle, comprising multiple wheel brakes, each of which is mounted on a vehicle wheel, a sensor assembly of this type, which records at least one physical variable of the vehicle wheels, a primary control device, which executes at least one brake function of the vehicle based on the recorded at least one physical variable of the vehicle wheels, and a secondary control device, which executes at least one brake function of the vehicle based on the recorded at least one physical variable of the vehicle wheels.

In the present case, the control device or the primary control device or the secondary control device can be understood to be an electrical device that processes or evaluates recorded sensor signals. For this purpose, the control device can comprise at least one evaluation and control unit for receiving and processing electrical output signals, at least one computing unit for evaluating the processed output signals, at least memory unit for storing signals or data, at least one interface to a sensor element for reading output signals or to an actuator for outputting sensor signals to the actuator, and/or at least one communication interface for reading or outputting data embedded in a communication protocol. In the present case, the actuators are designed, for example, as solenoid valves or as pressure generators, which can be controlled by the control device accordingly. The at least one interface can be designed as hardware and/or software. In a hardware design, the interfaces can be part of a so-called system circuit, for example, which contains different functions of the control device. Such a system circuit is preferably designed as an application-specific integrated circuit (ASIC). For example, the at least one evaluation and control unit can be configured as an ASIC. However, it is also possible that the interfaces are separate, integrated circuits or at least partially consist of discrete structural elements. In a software design, the interfaces can be software modules that are present, for example, on a microcontroller in addition to other software modules. For example, the computing unit can be a signal processor, a microcontroller, or the like, wherein the memory unit can be a flash memory, an EEPROM, or a magnetic memory unit. Also advantageous is a computer program product comprising program code stored on a machine-readable carrier, such as a semi-conductor memory, a hard disk memory, or an optical memory and used in order to execute the evaluation when the program is carried out by the computing unit. The two control devices can execute different brake functions in conjunction with primary actuator technology or secondary actuator technology, for example ABS, ESP, ASR, and/or hill-hold functions (ABS: anti-blocking system, ESP: electronic stability program, ASR: acceleration slip regulation). The two control devices can execute different brake functions in normal operation. In the event of a failure of one of the two control devices, it can be provided that the other control device at least partially takes over the brake functions of the failed control device in order to form a corresponding fallback level.

In the present case, the primary actuator technology and secondary actuator technology can be understood to be a hydraulic and/or electromechanical assembly, via which, in the braking system, for the pressure build-up and/or pressure reduction in the wheel brakes, corresponding control and or regulating operations can be executed for an ABS function (ABS: anti-blocking system) or an ASR function (ASR: acceleration regulation control) or an electronic stability program (ESP) or for an automatic parking brake function. To execute the control and/or regulating operations, the primary actuator technology and the secondary actuator technology each comprise at least one brake pressure generator and a hydraulic valve unit comprising solenoid valves, which, due to the opposing forces "magnetic force," "spring force," and "hydraulic force" can usually be held in clear positions. Accordingly, the solenoid types "currentless open" and "currentless closed" are provided. In addition, bi-stable solenoid valves are used, which can be switched between a "currentless open" and a "currentless closed" state, wherein such a bi-stable solenoid valve remains permanently in the respective operating state until the next switch signal. The brake pressure generator is in particular actuatable by muscular force, auxiliary force, and/or external power. "Auxiliary force" means muscle-powered actuation assisted by a brake booster. To execute the parking brake function, an electro-mechanical actuator can be arranged on the vehicle wheels of at least one vehicle axle, preferably the rear axle, which actuator can be activated or deactivated via corresponding actuation signals.

In the present case, a sensor element can be understood to be an electrical component that directly or indirectly senses a physical variable or a change of a physical variable in the region of an associated vehicle wheel and preferably converts it into an electrical output signal. Preferably, such a sensor element can be designed as a speed sensor, wherein corresponding speed information items can preferably be determined by scanning a magnetic encoder or a ferromagnetic gear. For example, the magnetic encoder is designed as a transducer ring with multiple magnetic elements, in particular permanent magnets, which are arranged evenly over its circumference and have an alternating magnetic orientation and form a pair of magnetic poles. By means of the speed sensor, the magnetic fields of the magnetic elements are recorded upon rotation of the transducer ring, wherein, depending on the magnetic flux of the respective recorded magnetic field of an evaluation and control unit, an output current is provided by means of a current interface for further use as a speed information item. For example, the speed sensors can comprise a Hall, GMR, AMR, or TMR sensor element (GMR: giant magnetoresistance, AMR: anisotropic magnetoresistance, TMR: tunnel magnetoresistance). In this case, the respective speed sensor can transmit its output signal as a data protocol, for example as an AK protocol or I protocol, via the current interface to the corresponding evaluation and control unit. For example, in order to determine the speed information item, the speed sensors record magnetic pole pair zero passages, wherein a so-called "speed pulse" is generated at each magnetic pole pair zero passage, i.e., a sign change of the recorded magnetic field strength, which represents the actual speed information item. The AK protocol comprises the "speed pulse" as a speed information item and at least one additional speed information item as a data item with multiple protocol bits. The protocol bits define the data content of the at least one additional speed information item. For example, the at least one additional speed information item relates to a rotational direction information item, an air gap information item, a temperature information item, a pressure information, etc.

In the present case, an evaluation and control unit can be understood to mean an electric circuit, preferably an application-specific integrated circuit (ASIC), which receives and outputs or processes output signals from sensor elements and outputs them as processed output signals. Thus, a sensor current flowing through the respective sensor element can be modulated with information regarding a recorded measured variable and transmitted to the associated evaluation and control unit and converted there into a voltage signal representing the corresponding measurement information. In addition, the individual evaluation and control units can, for example, provide the respective "speed pulse" representing the actual measurement information item as a voltage signal via a point-to-point connection to the at least one evaluation and control unit in another control device in real time. The evaluation and control unit can have multiple interfaces, which are designed as part of the evaluation and control unit. However, it is also possible that the interfaces are separate, integrated circuits or at least partially consist of discrete structural elements.

With the measures and further developments described in the disclosure, advantageous improvements of the sensor assembly for a vehicle specified in the disclosure are possible.

It is particularly advantageous that the control devices can each comprise at least one computing unit. In this case, the individual evaluation and control units can transmit processed output signals to the at least one computing unit of the corresponding control device. Furthermore, the processed output signals can include additional measurement information, such as a rotational direction information item, air gap information item, temperature information item, pressure information item, etc., and can be transmitted from the individual evaluation and control units to the corresponding computing unit. The individual computing units can evaluate the processed output signals in order to execute the corresponding at least one brake function of the vehicle.

In an advantageous embodiment of the sensor assembly, the at least one physical variable can represent a motion-based measured variable and/or another measured variable of the corresponding vehicle wheel. For example, the motion-based measured variable can represent a speed and/or rotational speed and/or a rotational direction. For example, the at least one other measured variable of the corresponding vehicle wheel can represent a temperature and/or tire pressure.

In a further advantageous embodiment of the sensor assembly, the computing units can each generate measurement data of the individual vehicle wheels based on the processed output signals and can provide this data to a data bus for distribution in the vehicle. For example, the data bus can be a CAN bus system or an Ethernet or a FlexRay. Of course, other suitable networks or a combination of said networks can also be used in the vehicle in order to distribute the measurement data.

In a further advantageous embodiment of the sensor assembly, the two sensor elements on the brakeable vehicle wheels of the second vehicle axle can each be combined into a dual sensor. The individual sensor elements on the brakeable vehicle wheels of the first vehicle axle can be each designed as standard speed sensors. By partially designing the sensor elements as standard speed sensors, an inexpensive implementation of the sensor assembly according to the disclosure is enabled.

In a further advantageous embodiment of the sensor assembly, a first control device of the at least two control devices can comprise a first evaluation and control unit. A second control device of the at least two control devices can comprise a second evaluation and control unit and a third evaluation and control unit. Here, the first evaluation and control unit can be assigned to the brakeable vehicle wheels of the second vehicle axle. The second evaluation and control unit can be assigned to the brakeable vehicle wheels of the second vehicle axle and a first brakeable vehicle wheel of the first vehicle axle. The third evaluation and control unit can be assigned to a second brakeable vehicle wheel of the first vehicle axle.

In a further advantageous embodiment of the sensor assembly, the second evaluation and control unit assigned to the first brakeable vehicle wheel of the first vehicle axle and the third evaluation and control unit assigned to the second brakeable vehicle wheel of the first vehicle axle can each transmit the received output signals of the associated sensor elements to the first evaluation and control unit.

In a further advantageous embodiment of the sensor assembly, the control devices can each comprise a redundant power supply. Thus, the evaluation and transmission of the output signals and the associated vehicle functions can also be executed in the event of a failure of one of the power supplies.

In a further advantageous embodiment of the sensor assembly, the first control device can be designed as a primary control device and can control an ESP system or an ESP system comprising a vacuum-independent electro-hydraulic brake booster. The second control device can be designed as a secondary control device and can control a vacuum-independent electro-hydraulic brake booster or a redundant braking unit. The at least one further control device can be a drive control device designed to control an inverter of an electric drive of the vehicle or a central control device designed to calculate motion trajectories.

In embodiments of the sensor assembly and the multi-circuit braking system comprising a sensor assembly of this type, in a fault event during failure of one of the evaluation and control units, the output signals and the processed output signals of at least three sensor elements are still available for evaluation in both control devices. In detail, in the event of a failure of the first evaluation and control unit, the output signals and the processed output signals of four sensor elements are still available to the second control device on the four brakeable vehicle wheels, while no processed output signals are available to the computing unit of the first control device. In the event of a failure of the second evaluation and control unit, the output signals and the processed output signals of three sensor elements are still available to the first control device on three brakeable vehicle wheels, while only one processed output signal is available to the computing unit of the second control device. In the event of a failure of the third evaluation and control unit, the output signals and the processed output signals of three sensor elements are still available to the first control device on three brakeable vehicle wheels, and three processed output signals are available to the computing unit of the second control device. In the event of a failure of one of the computing units in one of the control devices, the output signals and the processed output signals of the four brakeable vehicle wheels are still available for evaluation in the other of the two control devices. In the event of a failure of one of the four sensor elements on the vehicle wheels of the first vehicle axle, the output signals and the processed output signals from four brakeable vehicle wheels are further available for evaluation in one of the two control devices, and in the other control unit, only the output signals and the processed output signals from three brakeable vehicle wheels are available for evaluation. In the event of a failure of one of the two sensor elements on the vehicle wheels of the second vehicle axle, only the output signals and the processed output signals of three brakeable vehicle wheels are still available to both control devices for evaluation.

An exemplary embodiment of the disclosure is shown in the drawing and explained in further detail in the following description. In the drawing, identical reference numerals refer to components and elements that execute the same or analog functions.

BRIEF DESCRIPTION OF THE DRAWING

FIG. 1 shows a schematic block diagram of an exemplary embodiment of a sensor assembly for a vehicle according to the present disclosure.

DETAILED DESCRIPTION

As can be seen from FIG. 1, the illustrated exemplary embodiment of a sensor assembly 1 for a vehicle according to the disclosure comprises at least two control devices ECU1, ECU2, each having at least one evaluation and control unit 10, 10A, 10B, 10C, and multiple sensor elements DF1, DF2, DF3, DF4, DF5, DF6, which are each assigned to a brakeable vehicle wheel VL, VR, HL, HR and one of the evaluation and control units 10A, 10B, 10C of control devices ECU1, ECU2 and record at least one physical variable of the associated vehicle wheel VL, VR, HL, HR and output same as an output signal ASVL, ASVR, ASHL1, ASHR1, ASHL2, ASHR2 directly to the associated evaluation and control unit 10A, 10B, 10C. The control devices ECU1, ECU2 execute at least one brake function of the vehicle 1 based on the recorded physical variables of the brakeable vehicle wheels VL, VR, HL, HR. Here, a sensor element DF1, DF2 is arranged at least on each of the brakeable vehicle wheels VL, VR of a first vehicle axle VA, wherein the output signals ASVL, ASVR thereof are output to different evaluation and control units 10B, 10C, which are arranged in a common control device ECU2, and wherein two sensor elements DF3, DF5; DF4, DF6 are arranged at least on each of the brakeable vehicle wheels HL, HR of a second vehicle axle HA, wherein the output signals ASHL1, ASHL2, ASHR1, ASHR2 thereof are output to evaluation and control units 10A, 10B, which are arranged in different control devices ECU1, ECU2. The evaluation and control units 10B, 10C associated with the first vehicle axle VA output the respective received output signal ASVL, ASVR to at least one evaluation and control unit 10A of another control device ECU1, such that the individual control devices ECU1, ECU2 each receive the corresponding at least one recorded physical variable from all brakeable vehicle wheels VL, VR, HL, HR.

As can be further seen from FIG. 1, the individual sensor elements DF1, DF2 are each designed as standard speed sensors on the brakeable vehicle wheels VL, VR of the first vehicle axle VA, here the front axle. Here, a first sensor element DF1 is assigned to a first vehicle wheel VR of the first vehicle axle VA, and a second sensor element DF2 is assigned to a second vehicle wheel VL of the first vehicle axle VA. The two sensor elements DF3, DF5; DF4, DF6 on the brakeable vehicle wheels HL, HR of the second vehicle axle HA are each combined to form a dual sensor DDF1, DDF2. Here, the two sensor elements DF3, DF5 of a first dual sensor DDF1 are assigned to a first vehicle wheel HL of a second vehicle axle HA, here the rear axle. The two sensor elements DF4, DF6 of a second dual sensor DDF2 are assigned to a second vehicle wheel HR of the second vehicle axle HA.

As can be further seen in FIG. 1, a first control device ECU1 in the illustrated exemplary embodiment comprises a first evaluation and control unit 10A, and a second control device ECU2 comprises a second evaluation and control unit 10B and a third evaluation and control unit 10C. Here, the first evaluation and control unit 10A is assigned to the brakeable vehicle wheels HL, HR of the second vehicle axle HA. The second evaluation and control unit 10B is assigned to the brakeable vehicle wheels HL, HR of the second vehicle axle HA and the first brakeable vehicle wheel VR of the first vehicle axle VA. The third evaluation and control unit 10C is assigned to the second brakeable vehicle wheel VL of the first vehicle axle VA.

As can be further seen from FIG. 1, a first sensor element DF3 of the first dual sensor DDF1 is assigned to the first evaluation and control unit 10A of the first control device ECU1, and a second sensor element DF5 of the first dual sensor DDF1 is assigned to the second evaluation and control unit 10B of the second control device ECU2. Additionally, a first sensor element DF4 of the second dual sensor DDF2 is assigned to the first evaluation and control unit 10A of the first control device ECU1, and a second sensor element DF6 of the second dual sensor DDF2 is assigned to the second evaluation and control unit 10B of the second control device ECU2. Furthermore, the first sensor element DF1 of the first vehicle wheel VR of the first vehicle axle VA is assigned to the second evaluation and control unit 10B of the second control device ECU2, and the second sensor element DF2 of the second vehicle wheel VL of the first vehicle axle VA is assigned to the third evaluation and control unit 10C of the second control device ECU2. The second evaluation and control unit 10B assigned to the first brakeable vehicle wheel VR of the first vehicle axle VA and the third evaluation and control unit 10C assigned to the second brakeable vehicle wheel VL of the first vehicle axle VA each transmit the received output signals ASVR, ASVL of the associated sensor elements DF1, DF2 to the first evaluation and control unit 10A. Thus, the first evaluation and control unit 10A of the first control device ECU1 directly receives the recorded at least one physical variable of the first vehicle wheel HL of the second vehicle axle HA as an output signal ASHL1 of the corresponding first sensor element DF3 of the first dual sensor DDF1 and the recorded at least one physical variable of the second vehicle wheel HR of the second vehicle axle HA as an output signal ASHR1 of the corresponding first sensor element DF4 of the second dual sensor DDF2. Additionally, the first evaluation and control unit 10A of the first control device ECU1 receives the recorded at least one physical variable of the first vehicle wheel VR of the first vehicle axle VA as an output signal ASVR of the corresponding first sensor element DF1 indirectly via the second evaluation and control unit 10B of the second control device ECU2 and the recorded at least one physical variable of the second vehicle wheel VL of the first vehicle axle VA as an output signal ASVL of the corresponding second sensor element DF2 indirectly via the third evaluation and control unit 10C of the second control device ECU2. The second evaluation and control unit 10B of the second control device ECU2 directly receives the recorded at least one physical variable of the first vehicle wheel HL of the second vehicle axle HA as an output signal ASHL2 of the corresponding second sensor element DF5 of the first dual sensor DDF1 and the recorded at least one physical variable of the second vehicle wheel HR of the second vehicle axle HA as an output signal ASHR2 of the corresponding second sensor element DF6 of the second dual sensor DDF2, as well as the recorded at least one physical variable of the first vehicle wheel VR of the first vehicle axle VA as an output signal ASVR of the corresponding first sensor element DF1. The third evaluation and control unit 10C of the second control device ECU2 directly receives the recorded at least one physical variable of the second vehicle wheel VL of the first vehicle axle VA as an output signal ASVL of the corresponding second sensor element DF2.

As can further be seen from FIG. 1, the two control devices ECU1, ECU2 in the illustrated exemplary embodiment each comprise a computing unit 3, 3A, 3B, wherein the first control device ECU1 comprises a first computing unit 3A and the second control device ECU2 comprises a second computing unit 3B. In addition, the two control units ECU1, ECU2 each comprise a redundant power supply, not shown.

In the illustrated exemplary embodiment, the first evaluation and control unit 10A of the first control device ECU1 prepares the output signals ASHL1, ASHL2, ASVR, ASVL of the first sensor element DF3 of the first dual sensor DDF1, the first sensor element DF5 of the second dual sensor DDF2, the first sensor element DF1, and the second sensor element DF2 and outputs the processed output signals AASHL1, AASHL2, AASVR, AASVL to the first computing unit 3A of the first control device ECU1. The second evaluation and control unit 10B of the second control device ECU2 prepares the output signals ASHL1, ASHL2, ASVR of the second sensor element DF5 of the first dual sensor DDF1, the second sensor element DF6 of the second dual sensor DDF2, and the first sensor element DF1 and outputs the processed output signals AASHL1, AASHL2, AASVR to the first computing unit 3B of the second control device ECU2. The third evaluation and control unit 10C of the second control device ECU2 prepares the output signal ASVL of the second sensor element DF2 and outputs the processed output signal AASVL to the second computing unit 3B of the second control device ECU2. The two computing units 3A, 3B evaluate the processed output signals AASHL1, AASHL2, AASHR1, AASHR2, AASVR, AASVL in order to execute the corresponding at least one brake function of the vehicle. In the illustrated exemplary embodiment, the computing units 3A, 3B generate measurement data of the individual vehicle wheels VL, VR, HL, HR based on the processed output signals AASVL, AASVR, AASHL1, AASHL2, AASHR1, AASHR2 and provide these to a data bus 5 for distribution in the vehicle.

Of course, a different assignment of the individual sensor elements DF1, DF2, DF3, DF4, DF5, DF6 than the one illustrated is also possible. For example, the two dual sensors DDF1, DDF2 can be assigned to the vehicle wheels VR, VL of the first vehicle axle VA, and the standard speed sensors can be assigned to the vehicle wheels HR, HL of the second vehicle axle HA. Furthermore, the evaluation and control units 10A, 10B, 10C can additionally transmit the received output signals ASVL, ASVR, ASHL1, ASHR1, ASHL2, ASHR2 of the associated sensor elements DF1, DF2, DF3, DF4, DF5, DF6 to at least one further control device in an alternative embodiment of the sensor assembly 1, not shown. The at least one further control unit device is, for example, a drive control device designed to control an inverter of an electric drive of the vehicle 1 or a central control drive designed to calculate motion trajectories.

The sensor elements DF1, DF2, DF3, DF4, DF5, DF6 each record at least one physical variable, which represents a motion-based measured variable and/or another measured variable of the corresponding vehicle wheel VR, VL, HL, HR. In the illustrated exemplary embodiment, the at least one motion-based measured variable represents a speed and a rotational direction. Of course, the recorded physical variable can also represent a different motion-based measured variable, for example a rotational speed. In the illustrated exemplary embodiment, the at least one other measured variable of the corresponding vehicle wheel VR, VL, HL, HR represents a temperature in the environment of the sensor element DF1, DF2, DF3, DF4, DF5, DF6. Of course, the recorded physical variable can also represent another measured variable, for example, a tire pressure or air gap information item.

The described exemplary embodiment of the sensor assembly 1 for a vehicle according to the disclosure, which records at least one physical variable of the vehicle wheels VR, VL, HL, HR, is preferably used in a multi-circuit braking system, in particular for a highly automated or autonomous vehicle. Such a multi-circuit braking system comprises multiple wheel brakes, not shown, which are arranged on a vehicle wheel VR, VL, HL, HR, a primary control device PSG, which executes at least one brake function of the vehicle based on the recorded at least one physical variable of the vehicle wheels VR, VL, HL, HR, and a secondary control device SSG, which executes at least one brake function of the vehicle based on the recorded at least one physical variable of the vehicle wheels, VR, VL, HL, HR. Here, the first control device ECU1 is designed as the primary control device PSG and the second control device ECU2 is designed as the secondary control device SSG.

Here, the primary control device PSG can drive an ESP system or an ESP system comprising a vacuum-independent electro-hydraulic brake booster or an integrated power brake (IPB). The secondary control device SSG can control a vacuum-independent electro-hydraulic brake booster or a redundant braking unit.

The primary control device PSG and the secondary control device SSG receive the output signals ASVL, ASVR, ASHL1, ASHR1, ASHL2, ASHR2 of the associated sensor elements DF1, DF2, DF3, DF4, DF5, DF6 in real time for further evaluation and for carrying out the corresponding brake functions or for carrying out the primary stabilization of the vehicle or the secondary stabilization of the vehicle in an emergency event when the primary stabilization fails. In order to execute the corresponding brake functions and the primary stabilization of the vehicle, the primary control device PSG controls a corresponding primary actuator system, not shown in further detail, via which a pressure build-up or pressure reduction in the wheel brakes and corresponding control and/or regulating operations can be executed. In order to execute the corresponding brake functions and the secondary stabilization of the vehicle, the secondary control device SSG controls a corresponding secondary actuator system, not shown in further detail, via which a pressure build-up or pressure reduction in the wheel brakes and corresponding control and/or regulating operations can be executed. To execute a parking brake function, at least one of the two control devices ECU1, ECU2 is electrically connected via an electrical connection to a corresponding actuator, not shown, of an electrical parking brake. Preferably, the actuators of the parking brake function are arranged on the vehicle wheels HL, HR of the second vehicle axle HA or rear axle, respectively. In an alternative embodiment, not shown, of the sensor assembly 1, the actuators of the electrical parking brake are additionally or alternatively arranged on the vehicle wheels VR, VL of the first vehicle axle VA or the front axle, respectively.

The invention claimed is:

1. A sensor assembly for a vehicle, comprising:
a plurality of sensor elements, each sensor element being assigned to an associated brakeable vehicle wheel of the vehicle and being configure to record at least one physical variable of the associated brakeable vehicle wheel; and
at least two control devices, each control device having at least one respective evaluation and control unit,
wherein each sensor element of the plurality of sensor elements is assigned to one of the at least two control devices and configured to output the at least one physical variable of the associated brakeable vehicle wheel as a respective output signal directly to the respective evaluation and control unit,
wherein the control devices are each configured to execute at least one respective brake function of the vehicle based on the recorded at least one physical variable,
wherein the plurality of sensor elements includes a respective sensor element arranged on each brakeable vehicle wheel of a first vehicle axle, and the respective output signals thereof are output to different respective evaluation and control units, which are arranged in a common control device of the at least two control devices,
wherein the plurality of sensor elements includes two sensor elements of a same type arranged on each brakeable vehicle wheel of a second vehicle axle, and the respective output signals of the two sensor elements are output to respective evaluation and control units which are arranged in different control devices of the at least two control devices, and
wherein the respective evaluation and control units associated with the first vehicle axle are designed to output the respective output signal received thereby to the at least one respective evaluation and control unit of another control device of the at least two control devices, such that each of the at least two control devices receives the at least one recorded physical variable from all brakeable vehicle wheels.

2. The sensor assembly according to claim 1, wherein:
each respective control device of the at least two control devices includes at least one respective computing unit;
each of the at least one evaluation and control units is further designed to transmit processed output signals to the at least one respective computing unit of the respective control device; and
each of the at least one respective computing units is designed to evaluate the processed output signals in order to execute the at least one respective brake function of the vehicle.

3. The sensor assembly according to claim 1, wherein the at least one physical variable represents a motion-based measured variable and/or another measured variable of the associated brakeable vehicle wheel.

4. The sensor assembly according to claim 3, wherein the motion-based measured variable is a speed and/or a rotational speed and/or a rotational direction.

5. The sensor assembly according to claim 2, wherein the each of the at least one respective computing units generate measurement data of an associated vehicle wheel based on the processed output signals and provide this data to a data bus for distribution in the vehicle.

6. The sensor assembly according to claim 1, wherein:
the two sensor elements on the brakeable vehicle wheels of the second vehicle axle are each combined into a dual sensor; and
the respective sensor elements on the brakeable vehicle wheels of the first vehicle axle are each designed as standard speed sensors.

7. The sensor assembly according to claim 1, wherein:
a first control device of the at least two control devices comprises a first evaluation and control unit; and
a second control device of the at least two control devices comprises a second evaluation and control unit and a third evaluation and control unit.

8. The sensor assembly according to claim 7, wherein:
the first evaluation and control unit is assigned to the brakeable vehicle wheels of the second vehicle axle;
the second evaluation and control unit is assigned to the brakeable vehicle wheels of the second vehicle axle and to a first brakeable vehicle wheel of the first vehicle axle; and
the third evaluation and control unit is assigned to a second brakeable vehicle wheel of the first vehicle axle.

9. The sensor assembly of claim 8, wherein the second evaluation and control unit assigned to the first brakeable vehicle wheel of the first vehicle axle and the third evaluation and control unit assigned to the second brakeable vehicle wheel of the first vehicle axle each transmit the received output signals of the associated sensor elements to the first evaluation and control unit.

10. The sensor assembly according to claim 7, wherein the evaluation and control units of the two control devices each transmit the received output signals of the associated sensor elements to at least one further control device.

11. The sensor assembly according to claim 1, wherein the control devices each comprise a redundant power supply.

12. The sensor assembly according to claim 1, wherein a first of the at least two control devices is designed as a primary control device and controls an ESP system or an ESP system comprising a vacuum-independent electro-hydraulic brake booster.

13. The sensor assembly according to claim 12, wherein a second of the at least two control devices is designed as a secondary control device and controls a vacuum-independent electro-hydraulic brake booster or a redundant braking unit.

14. The sensor assembly according to claim 10, wherein the at least one further control unit is a drive control unit designed to control an inverter of an electric drive of the vehicle or a central control unit designed to calculate motion trajectories.

15. A multi-circuit braking system, for a highly automated or autonomous vehicle, comprising:
multiple wheel brakes, each of which is mounted on a respective vehicle wheel;
a sensor assembly designed according to the sensor assembly of claim 1;
a primary control device configured to execute (PSG), which executes the at least one respective brake function of the vehicle based on the recorded at least one physical variable; and
a secondary control device configured to execute the at least one respective brake function of the vehicle based on the recorded at least one physical variable.

\* \* \* \* \*